United States Patent [19]

Cantrell et al.

[11] E Re. 30,898

[45] Reissued Apr. 6, 1982

[54] INFRARED LASER SYSTEM

[75] Inventors: Cyrus D. Cantrell, Richardson, Tex.; Robert J. Carbone, Johnson City, Tenn.; Ralph Cooper, Hayward, Calif.

[73] Assignee: The United States of America as represented by the United States Department of Energy, Washington, D.C.

[21] Appl. No.: 967,171

[22] Filed: Mar. 16, 1979 (Under 37 CFR 1.47)

Related U.S. Patent Documents

Reissue of:

[64] Patent No.: 4,061,921
Issued: Dec. 6, 1977
Appl. No.: 466,583
Filed: May 2, 1974

[51] Int. Cl.[3] ..... H01J 27/00; H01S 3/00

[52] U.S. Cl. ..... 307/426; 250/423 P; 330/4.3; 372/4

[58] Field of Search ..... 250/423 P; 307/426; 330/4.3; 331/94.5 N

[56] References Cited

U.S. PATENT DOCUMENTS

| | | | |
|---|---|---|---|
| 3,558,877 | 1/1971 | Pressman | 331/94.5 A |
| 3,668,420 | 6/1972 | Vanderslice | 307/426 |
| 3,772,519 | 11/1973 | Levy et al. | 250/288 |
| 3,789,235 | 1/1974 | Bridges et al. | 307/425 |
| 3,941,670 | 3/1976 | Pratt, Jr. | 332/7.51 |

OTHER PUBLICATIONS

D. Metz, Science, vol. 191, Mar. 1976, pp. 1162, 1163, 1193.

Ambartzumian et al., Applied Optics, vol. 11, No. 2, Feb. 1972.

R. L. Byer et al., J. Opt. Soc. Am., vol. 68, No. 11, Nov. 1978, pp. 1622–1623.

R. L. Byer, IEEE J. of Quantum Electronics, Nov. 1976, pp. 732–733.

Paisner et al., Energy and Technology Review, UCRL-52000-79-3, Mar. 1979, pp. 1–3.

P. Rabinowitz et al., Optics Letters, vol. 3, No. 4, Oct. 1978, p. 147.

R. L. Byer et al., Optics Letters, vol. 3, No. 4, Oct. 1978, p. 144.

R. L. Byer, J. Opt. Soc. Am., 1978, Annual Meeting, pp. 1393–1394.

*Primary Examiner*—S. C. Buczinski

*Attorney, Agent, or Firm*—Paul D. Gaetjens; William W. Cochran, II; James E. Denny

[57] ABSTRACT

An infrared laser system and method for isotope separation may comprise a molecular gas laser oscillator to produce a laser beam at a first wavelength, Raman spin flip means for shifting the laser to a second wavelength, a molecular gas laser amplifier to amplify said second wavelength laser beam to high power, and optical means for directing the second wavelength, high power laser beam against a desired isotope for selective excitation thereof in a mixture with other isotopes. The optical means may include a medium which shifts the second wavelength high power laser beam to a third wavelength, high power laser beam at a wavelength coincidental with a corresponding vibrational state of said isotope and which is different from vibrational states of other isotopes in the gas mixture.

7 Claims, 5 Drawing Figures

INFRARED LASER SYSTEM

Matter enclosed in heavy brackets [ ] appears in the original patent but forms no part of this reissue specification; matter printed in italics indicates the additions made by reissue.

BACKGROUND OF THE INVENTION

More and more new uses are being discovered and present uses are being rapidly expanded for materials which are enriched in one or more specific isotopes in such fields as medicine, nuclear energy production and use, and the like. It is desirable because of this increased demand for isotopic enrichment that processes be deveoped which produce relatively large quantities of materials enriched in certain isotopes and at a relatively low cost. The complexity and cost aspects of isotope separation and enrichment [is] *are* further complicated by the fact that it is generally more difficult to separate isotopic species of heavier or high atomic weight elements than it is for lower atomic weight elements.

Apparatus and process which is capable of producing relatively large quantities of materials enriched in one or more isotopes for relatively low cost is described in copending application Ser. No. 443,169, entitled "Apparatus and Method for Laser Induced Isotope Separation" by C. Paul Robinson, Reed J. Jensen, Theodore P. Cotter, Keith Boyer and Norman R. Greiner, and filed Feb. 20, 1974 which is a continuation in part of application Ser. No. 387,859, filed Aug. 14, 1973 for "Isotope Separation by Laser Means" by the same inventors. In the described apparatus and process, the raw material to be enriched is adiabatically expanded through a nozzle to a reduced temperature and high flow rate in a gaseous stream. The cooling of the gas in the rapid manner provided by the nozzle provides a unique means of unequivocally making available the discrete vibrational level shift of the isotopes by suppressing all other interfering states. The cooled gas is irradiated by an infrared laser to selectively excite a vibrational state of an isotope in the gas mixture. The gas stream which now includes the excited isotope is then irradiated by an ultraviolet beam to increase the energy of the excited isotope to a level where it may photo-decompose, photo-ionize or otherwise photo-dissociate in a manner allowing separation from other isotopes.

It has been found that this apparatus and process will be particularly useful in separation or enrichment of isotopes of such as uranium and plutonium, and particularly uranium-235 and uranium-238. In order to provide maximum rates of isotopic enrichment at minimum costs for these isotopes, it is desirable that the infrared radiation be produced with an infrared laser which produces an output laser beam at wavelengths near 7.75, 8.62, 12.2 or 16 microns. In addition, it is desirable that the laser beam be in a pulse mode of operation having up to 10,000 laser pulses per second of about 0.2 microseconds in duration and with a pulse energy of about 0.05 joule and an average beam power of about 100 watts. There are no laser systems or arrangements in the prior art which are capable of operating at these wavelengths and under these restrictions.

SUMMARY OF THE INVENTION

In view of the above, it is an object of this invention to provide infrared laser systems for use in separation of isotopes.

It is a further object of this invention to provide infrared laser systems which are capable of producing very high power laser beams.

It is a further object of this invention to provide high power laser beams at specific wavelengths which correspond with excitable vibrational states of uranium hexafluoride or other gaseous uranium compounds at reduced temperatures.

It is a further object of this invention to provide infrared laser arrangements which produce high power laser beams at selected wavelengths which are not inherent to a particular lasing medium.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art.

The present invention relates to an infrared laser system which utilizes a molecular gas laser oscillator to produce a laser beam at a basic wavelength, Raman spin flip apparatus to shift the wavelength of this laser beam to a second wavelength, and a molecular gas laser amplifier to amplify the second wavelength laser beam to high power and may also include a Raman scattering medium for shifting the amplified second wavelength laser beam to a longer wavelength, high power laser beam.

DESCRIPTION OF THE DRAWING

The present invention is illustrated in the accompanying drawings wherein.

DETAILED DESCRIPTION

As is brought out in the copending application referenced above, natural uranium hexafluoride ($UF_6$) exhibits several vibrational absorption bands in the infrared spectra in either fundamental or combination modes. When the $UF_6$ is cooled to temperatures of from about 40° to 50° K by adaiabatic expansion in a nozzle, the U-238 and U-235 isotopes exhibit an isotopic shift of about 0.5 to 0.7 inverse centimeters ($cm^{-1}$) and significant absorption line narrowing at ground vibrational states. It has been found that there are such ground vibrational states having isotopic shifts and high infrared absorption at wavelengths of about 7.75, 8.62, 12.2 and 16 microns. These wavelengths correspond with the combination and fundamental modes of vibrational states $\nu_1+\nu_3$, $\nu_2+\nu_3$, $\nu_3+\nu_5$ and $\nu_3$, respectively. If the so-cooled $UF_6$ is irradiated by a high power infrared beam at a wavelength corresponding to the isotope vibrational state having a line-width narrow enough to only excite a selected isotope, the selected isotope may be excited by infrared absorption and may then be further excited by an appropriate ultraviolet beam to an energy at which the selected isotope may be separated from the $UF_6$ gas stream. The separated isotope may then be collected in a highly purified state, or the gas, which is now depleted in this isotope and thus enriched in the other isotope, may be collected and/or further enriched by additional separations, as desired.

The infrared excitation beam must therefore be precisely tuneable to a particular wavelength and have a line-width sufficiently narrow so as not to excite the other isotope at a nearby ground state wavelength and also exhibit sufficient power and energy to cause the selected isotope to be excited to a level at which it may be further excited by ultraviolet energy. The infrared beam should have a line-width of no more than about 0.01 $cm^{-1}$ and possible be tuneable to within about 0.005 $cm^{-1}$ to avoid deleterious excitation of the other isotope at adjacent absorption lines. The amount of power or energy required will depend to a certain extent on the flow rate of the $UF_6$, the desired rate of isotope enrichment and/or separation, the number of laser beams utilized to deplete the $UF_6$ gas of the selected isotope and whether the infrared beam is operated in a continuous wave or pulsed mode of operation, but will generally be in excess of about 0.01 joules of energy per pulse and 100 watts average power at a pulse rate of about $10^4$ pulses/second.

Figure 1:
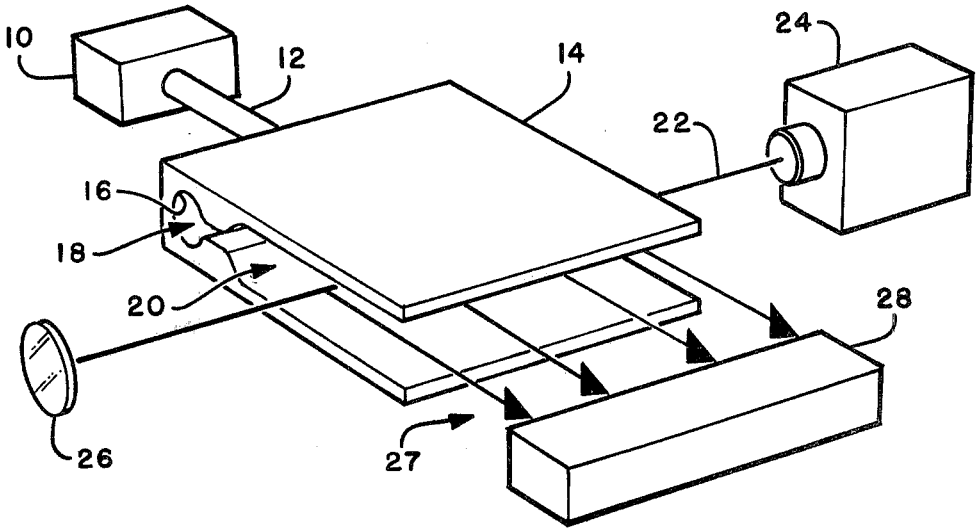
FIG. 1 is a perspective and somewhat diagrammatic view of an isotope separation or enriching system utilizing a laser system of this invention.

A typical isotope separation configuration which utilizes the laser systems of this invention is illustrated in diagrammatic and simplified form in FIG. 1. The gas which includes a mixture of the isotopes to be separated or enriched with or without an appropriate carrier gas may be stored in an appropriate container 10 and be fed by conduit 12 to an expansion nozzle 14 of suitable design and configuration. The isotope containing gas is first fed into a chamber or plenum 16 in nozzle 14 under high pressure, such as from about 1000 to 2000 torr, and then flowed through a constriction 18 to an expansion chamber 20 so as to provide an adiabatic expansion of the gases in chamber 20. The gas may be accelerated from chamber 16 to chamber 20 to a speed of from about Mach 4 to Mach 5 and may be cooled to a temperature of about 50° K. At this temperature, practically all of the gas molecules are in their ground vibrational states. The laser beam 22 of infrared radiation may then be directed through the cooled gas in chamber 20 by a laser system 24 and appropriate optics 26. With the infrared beam 22 tuned to a desired wavelength and with appropriate line-width and energy, the ground vibrational state of one of the isotopes in the gas stream may be excited to a desired level. An additional beam of ultraviolet radiation (not shown) may be directed along the same path as beam 22 from laser system 24, or along a separate path of a separate laser system, as needed, through the cooled gas stream in chamber 22 to further excite these excited isotope atoms to a level where separation from the gas stream may be achieved. The infrared laser beam 22, and for that matter the ultraviolet beam, may be reflected repetitively through chamber 20 in an appropriate manner and the chamber 20 may form part of laser system 24, if desired. The excited isotope atoms and other components of the gas stream 27 may be conveyed from the nozzle 14 into an appropriate separation mechanism 28 in which the excited isotope is separated from the other gas component and the gas depleted by this isotope then removed, stored or otherwise utilized. In a typical arrangement, using $UF_6$, the uranium-235 isotope may be separated by photo-decomposition to uranium-235 pentafluoride ($UF_5$) which is a solid and readily separable from the gaseous stream. The gaseous stream, after separation of the 235 $UF_5$, includes the remaining $UF_6$ and is enriched in uranium-238 and may be further enriched or otherwise utilized.

Figure 2:
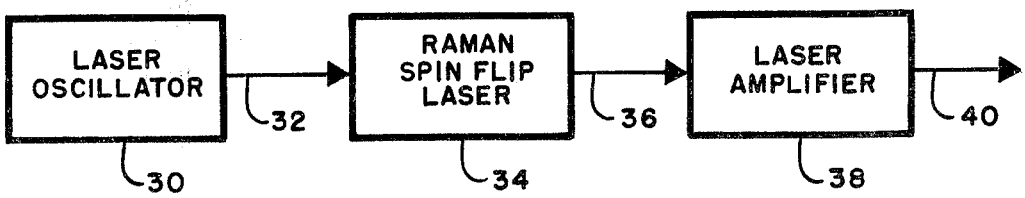
FIG. 2 is a somewhat simplified block diagram showing the major components of the laser system of this invention.
Figure 3:
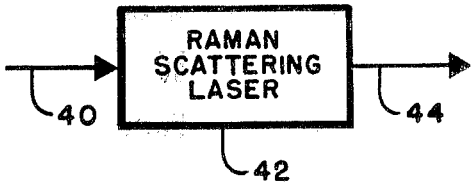
FIG. 3 is a block diagram of an alternate laser system arrangement.

A representative laser system which may be utilized for laser system 24 to produce the infrared beam 22 is illustrated in FIG. 2. The system may include a molecular gas laser oscillator 30 which produces a laser beam 32 at a first infrared wavelength. The beam 32 may then be directed through a Raman spin flip laser 34 which is in optical alignment therewith to provide a shifting of the laser beam 32 to a second wavelength which is emitted as an infrared laser beam 36. The beam 36, in turn, is directed through a molecular gas laser amplifier 38 which amplifies the laser beam at the second wavelength to a high power beam 40 which may be directed through the chamber 20 of nozzle 14 in FIg. 1. If the second wavelength of infrared laser beam 40 is still not at the desired wavelength for vibrational excitation of an isotope in the gas stream of nozzle 14, it may be shifted to the desired wavelength, and possibly further amplified, by directing beam 40 through a Raman scattering medium or laser 42 in optical alignment therewith, as shown in FIG. 3, which produces an output infrared laser beam 44 having the desired wavelength, line-width and energy.

The molecular gas laser oscillator 30 may be any suitable laser oscillator arrangement which is capable of producing an infrared laser beam at a first wavelength near to but less than one of the desired wavelengths. The oscillator 30 may utilize a lasing medium including such gases as carbon monoxide (CO), carbon dioxide ($CO_2$), and carbonyl sulfide (OCS) which are appropriately exicted or pumped to lase at the first wavelength. The pumping may be achieved by a wide range of mechanisms including optical pumping, electrical discharge, radio frequency discharge, chemical reaction, exchange of excitation, gas dynamic pumping, or the like. The respective pumping mechanisms may be produced in transverse or longitudinal directions with respect to the lasing cavity in oscilltor 30 in either a static, low rate of gas flow or high gas flow operation, as required by the particular materials utilized and the requirements of the laser system. The lasing medium gases mentioned may be utilized in a relatively pure state or they may be mixed with other gases to enhance or otherwise affect the lasing action of the lasing gas or be composed of various combinations of isotope constituents. In addition, the gas, and its mixture if used, may be at particular pressures and/or temperatures which will enhance the desired lasing operation. Other molecular gas lasing mediums may be utilized so long as they are capable of producing an infrared lasing beam at a wavelength which is close enough to the desired isotope excitation wavelengths so that it may be shifted and tuned to the desired wavelength.

The Raman spin flip laser 34 utilizes a semiconductor crystal disposed in a magnetic field in a manner so that the photons from laser beam 32 lose energy when they collide with an electron in the crystal and flips its spin. The shifted Raman photon is separated in frequency from the pump photon by the magnitude of the electron spin energy. The electron spin energy is a function of the electron g-factor, the Bohr magneton and the magnetic field strength. The Raman photon may be at frequencies either downshifted or upshifted, as well as second and third stimulated Stokes components, though generally the downshifted is preferred because no population inversion is required, as would be the case with upshifting. These semiconductor crystals may include such materials as indium antimonide (InSb), mercury cadmium telluride ($Hg_xCd_{1-x}$), gallium antimide (GaSb), cadmiium sulfide (CdS), zinc selenite (ZnSe), and the like. The semiconductor crystals may be doped with appropriate materials to provide minority and majority carriers including such materials as tellurium, phosphorous, selenium, arsenic, etc. Using the preferred InSb with tellurium doping of $10^{16}$ atoms per cubic centimeter, a magnetic field of from about 20 to 100 kiloGauss (kG) may produce wave number shifts of from about 40 to 170 $cm^{-1}$. It is also desirable, in most applications, that the semiconductor crystal be maintained at a temperature of from about 2° to 30° K. to maintain the electron population difference. Under these conditions, the N-type InSb may convert over 80% of the laser beam 32 energy into the laser beam 36 energy. Laser beam 36 may have a line-width typically of about 0.05 $cm^{-1}$.

The laser amplifier 38, like laser oscillator 30 may be any diatomic or polyatomic molecular gas laser which may be excited to produce a stimulated laser beam by suitable external excitation and laser beam 36 at a wavelength at or near one of the desired excitation levels of the isotope to be separated. Suitable lasing mediums which may be used in amplifier 38 may include CO, $CO_2$, OCS, and the like. These gases may in turn be mixed with appropriate other gases such as nitrogen, helium, $H_2O$ and some other lasing medium gases to provide enhanced outputs for particular energy or other transitions with the primary lasing medium gas to produce a particular wavelength output. The gases may be heated, or cooled, or be at a suitable pressure in a static, continuous flow or intermittent flow operations, as desired. The external excitation may include electrical discharges as mentioned above, dynamic gas laser operation and various energy exchange processes similar to laser oscillator 30. The laser amplifier 38 may be adapted by appropriate optics to have the laser beam 36 make either a single or [miltiple] *multiple* passes through the lasing medium cavity of amplifier 38 depending on the desired degree of amplification and other considerations. The amplified laser beam 40 at a new and longer wavelength than laser beam 36 may be directed through the chamber 20 of nozzle 14 to achieve the selective isotopic excitation and consequent separation. The beam 40 may typically be at an energy of from about $10^{-3}$ to about 1 joules per pulse with a pulse duration of about $10^{-2}$ to 10 microseconds and line-width of about $10^{-3}$ to 0.01 $cm^{-1}$. If desired, additional fine tuning of the laser beam 40 wavelength (or for that matter 44 described below) may be achieved using *the* tuning method described in copending application Ser. No. 443,167 [to] *entitled* "Laser Fine Tuning Using a High Velocity Doppler Shift" by C. Paul Robinson and Jack P. Aldridge, filed Feb. 20, 1974.

If laser beam 40 is not precisely at one of the desired wavelengths for isotope excitation in chamber 20 of nozzle 14, the beam 40 at its second wavelength may be directed through an appropriate medium 42, as shown in FIG. 3, which will shift the wavelength of laser beam 40 to a third, desired wavelength as a beam 44 and direct beam 44 through the isotope mixture. The medium 42 may be a pressurized gas such as hydrogen, deuterium, methane or the like which may produce stimulated Raman scattering through resonant 4-photon processes to the desired wavelength. With proper selection of gas, gas pressure and cell size, the appropriate wavelength shifting may be achieved. The pressures of the gas in the cell should be selected so as not to unduly broaden the line-width of laser beam 44. Typical gas pressures may vary from about 10 to about 100 atmospheres and may be maintained at temperatures of from about 77° to 300° K. The beam 44 may be at the desired wavelength and energy, pulse repetition rate, pulse duration and line-width described above.

It is understood that either the laser arrangement of FIG. 2 or the combined laser arrangements of FIGS. 2 and 3 may be utilized as the laser system 24. In the arrangement of FIG. 2, laser beam 40 would be utilized as the laser beam 22 shown in FIG. 1 while in the arrangements of FIGS. 2 and 3, the laser beam 44 would be utilized as the laser beam 22.

Figure 4:
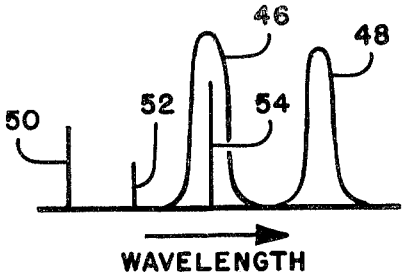
FIG. 4 is a diagram showing the preferred operation of the elements comprising the laser system as the respective laser beams are produced to effect excitation of an isotope species in an isotope mixture.
Figure 5:
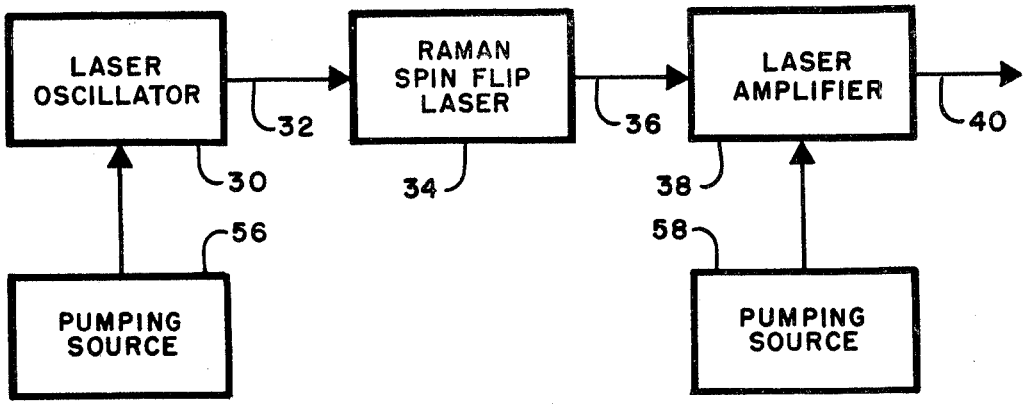
FIG. 5 is a block diagram showing additional features of the infrared laser system.

In order to get the correct combination of infrared wavelength, narrow line-width and high energy or power, it has been found that none of the materials which lase inherently at these desired wavelengths meet the other criteria. The criteria, however, may be met by using relatively high power and efficient lasing mediums which lase at wavelengths somewhat shorter than these desired wavelengths and then using the system of this invention to increase the wavelength and power and other criteria to meet the desired goals, as illustrated in FIG. 4 for isotope species having absorption states 46 and 48 at different but similar wave numbers which were shifted by gas cooling. In the present system, a monochromatic infrared laser beam at a first wavelength and energy level 50 generated in the wavelength-controlled infrared laser oscillator is then shifted to an appropriate second or intermediate wavelength 52 using a tuneable frequency converter. The shifted wavelength is then amplified to a higher energy in an infrared laser amplifier, and if desired, the amplified laser beam wavelength then further shifted by stimulated Raman scattering in a medium to the desired wavelength 54 coincident with an absorption state, such as state 46, of an isotope species. With this arrangement, the limited number of powerful infrared lasers may be utilized even though the absorption frequencies needed for isotope separation of such as uranium is very restricted. In addition, the shifting in the medium may be adjusted by a very small amount, such as to within 1 $cm^{31\ 1}$, to provide for a selection of either isotopic enrichment or isotopic depletion depending on whether the final wavelength selected corresponds to the minority or majority species in the isotope mixture.

Using this system, an arrangement which may produce a high energy infrared laser beam 44 at a wavelength of about 7.75 microns may include a CO laser oscillator 30 which may produce pulses of about $10^{-2}$ to 10 microseconds duration at a wavelength of 5.19 microns and about $10^{-4}$ to 1 joules per pulse. This wavelength is achieved from the stimulated emission of the P(21) rotational line of the V=6-5 transition in CO. The laser oscillator 30 may typically be about one meter long by 2 cm in diameter, be cooled in a liquid nitrogen bath, and be pumped with a 10 kilovolt longitudinal discharge applied through a gas mixture of such as about 0.263 torr CO, 3.57 torr He and 0.003 torr $O_2$. If it is desired, isotopes of the carbon and oxygen may be utilized to achieve slightly different wavelength operation. For example the use of C-13 and O-18 may shift the output wavelength by about 0.36 microns. The beam 32 from oscillator 30 should preferably be circularly polarized. The Raman spin flip laser 34 may use an N-doped InSb semiconductor crystal which is subjected to about 30 [Kg] *kg* magnetic field at a temperature of about 2° to 5° K. The output beam 36 from laser 34 may be at a wavelength of 5.32 microns and have an energy on the order of about 10% or more of the input beam energy. The laser amplifier 38 may be a CO amplifier which operates on the V=8-7 transition to amplify the beam 36 to the desired energy per pulse in beam 40. Using a medium 42 having a cavity length of about 3 meters and a gain medium of about 2 meters in length and with an incident intensity of beam 40 of about 50 $MN/cm^{-2}$, an output intensity of beam 44 of about 1 MW/cm may be achieved. With a hydrogen gas in medium 42, the pure rotational transition $S_o(1)$ from J=1 to J=3 in the vibrational ground state may be used to give a frequency shift of about 587 $cm^{-1}$ to a wavelength of about 7.75 microns with a line-width of about 0.05 $cm^{-1}$ or less and energy per pulse of about 10 to 50% of the input beam. It can be seen that other transitions, isotopes, operating conditions and the like may be utilized to provide still further wavelength and energy characteristics of the beam 44 at desired wavelengths for isotope separation or enrichment.

For example, using the same lasing mediums in oscillator 30, Raman spin flip laser 34, amplifier 38 and medium 42, an 8.62 micron wavelength beam 44 may be achieved having similar energy and power characteristics. Laser oscillator 30 may be operated with the $P_{8\text{-}7}(21)$ transition to achieve a beam 32 having a wavelength of about 5.32 microns. Using a 70 kG magnetic field in the Raman spin flip laser 34, a beam 36 having a wavelength of 5.72 microns may be directed against amplifier 38. The amplifier 38 in turn, may use a $P_{14\text{-}13}(16)$ transition to amplify this wavelength laser beam to high power, and the gas absorber 42 operated in a similar mode as described above to produce the 8.62 micron beam 44.

The same output wavelength of 8.62 microns may also be achieved by utilizing [as] *a* OCS gas lasing medium in oscillator 30 and amplifier 38. FIG. 4 illustrates further features which may be utilized with such a laser system. Oscillator 30 may include an $O^{12}CS$ gas medium which lases on the P(26) line when properly stimulated at a wavelength of 8.4 microns. Such lasing may be achieved by electrical discharge pumping or by a laser pumping source 56 which optically pumps this line. For exmple, a supersonic CO laser may produce a 4.87 micron wavelength pumping beam from the $P_{3\text{-}2}(9)$ transition. The 8.4 micron output beam 32 may be shifted with a 20 kG magnetic field in the Raman spin flip 34 InSb crystal to an 8.62 micron beam 36. The 8.62 micron beam 36 may be amplified by stimulation of the R(13) line of $O^{13}CS$ lasing gas medium in amplifier 38. The amplified 8.62 micron laser beam may be at the desired energy level to provide isotopic separation. The amplifier 38 may be pumped by a pumping source 58 to provide this operation. For example, pumping source 58 may be a CO supersonic laser which produces a 4.96 micron wavelength pumping beam from the $P_{5\text{-}4}(5)$ or $P_{4\text{-}3}(12)$ transitions to optically pump the $O^{13}CS$ lasing medium in amplifier 38. If desired, an appropriate pumping vibrational transfer medium may be mixed with the gas lasing medium in amplifier 38, such as $C^{13}O^{18}$, which in turn is stimulated by optical pumping from the pumping source 58.

Longer wavelength output beams 44 may be achieved by utilzing other lasing mediums in the oscillator 30 and amplifier 38 together with other operating parameters for the Raman spin flip oscillator 34 and gas absorber 42. For example, a 12.2 micron beam 44 may be achieved using a $CO_2$ gas medium in oscillator 30 and amplifier 38 with the oscillator 30 producing a 9.6 micron beam 32 from the 001-020 P(26) line. The Raman spin flip laser 34 may shift this wavelength to about 10.19 microns with a 35 kG magnetic field. The $CO_2$ laser amplifier 38 may be run on the 001-100 R(28) line to produce the desired high power beam 40. This beam may then be shifted by gas absorber 42 using a hydrogen gas on its J=0–2 rotational line to provide a 16 micron output beam 44 of proper energy. A higher wavelength beam 32 produced with a 10.6 micron 001–100 P(20) line with oscillator 30 may be utilized to provide a 12.2 micron beam 40 which may be utilized to produce isotopic separation or enrichment in nozzle 14. The frequency or wavelength shift produced by Raman spin flip laser 34 may be reduced by using isotopic $C^{13}O_2$ as the lasing medium in laser oscillator 30 which produces an output wavelength of about 0.5 microns longer than $CO_2$.

What is claimed is:

[1. An infrared laser irradiation system for generating a high power laser beam at a desired wavelength and narrow line-width for selective excitation of a vibrational state of an isotope in a cooled gaseous mixture containing said isotope at a temperature of from about 35° to 75° K. comprising molecular gas laser oscillator means for producing a laser beam at a first wavelength; Raman spin flip means in optical alignment with said laser beam for shifting said laser beam to a second wavelength; molecular gas laser amplifier means in optical alignment with the wavelength shifted laser beam for amplifying said second wavelength laser beam to said higher power; and optical means for directing said second wavelength beam through said cooled gaseous mixture at said desired wavelength and high power, wherein said second wavelength is intermediate said first wavelength and said desired wavelength and said optical means includes gas absorber means in optical alignment with said second wavelength laser beam for shifting said second and intermediate wavelength laser beam to a high power laser beam having said desired wavelength.]

[2. The laser system of claim 1 wherein the gaseous lasing medium in said laser oscillator and said laser amplifier means comprises CO, said first wavelength is at about 5.19 microns, said second wavelength is at about 5.32 microns, and said desired wavelength laser beam is at about 7.75 microns with a line-width less than about 0.01 $cm^{-1}$ and pulse energy of about $10^{-1}$ to about 1 joules.]

[3. The laser system of claim 1 wherein the gaseous lasing medium in said laser oscillator and said laser amplifier means comprises CO, said first wavelength is at about 5.32 microns, said second wavelength is at about 5.72 microns, and said desired wavelength laser beam is at about 8.62 microns with a line-width less than about 0.01 $cm^{-1}$ and pulse energy of about $10^{-3}$ to 1 joules.]

[4. The laser system of claim 1 wherein the gaseous lasing medium in said laser oscillator and said laser amplifier means comprises $CO_2$, said first wavelength is at about 9.6 microns, said second wavelength is at about 10.19 microns and said desired wavelength laser beam is at about 16 microns with a line-width less than about 0.01 $cm^{-1}$ and pulse energy of about $10^{-3}$ to 1 joules.]

[5. The laser system of claim 1 wherein said gaseous lasing medium comprises OCS, said first wavelength is at about 8.4 microns and said desired wavelength laser beam is at about 8.62 microns with a line-width of less than about 0.01 $cm^{-1}$ and pulse energy of about $10^{-3}$ to 1 joules.]

[6. The laser system of claim 5 wherein said OCS lasing medium in said laser oscillator means comprises $O^{12}CS$ and said OCS lasing medium in said laser amplifier means comprises $O^{13}CS$.]

[7. The laser system of claim 6 including means for vibrational transfer pumping of said $O^{13}CS$ lasing medium associated with said laser amplifier means including $C^{13}O^{18}$ mixed with said lasing medium.]

8. A laser system for generating a high power laser beam comprising molecular gas laser oscillator means for producing a laser beam at a first wavelength; Raman spin flip means in optical alignment with said laser beam for shifting said laser beam to a second wavelength; molecular gas laser amplifier means in optical alignment with the wavelength shifted laser beam for amplifying said second wavelength laser beam to said high power; and gas absorber means for shifting [said] *the amplified* second wavelength laser beam to a third wavelength high power laser beam.

[9. A method for producing a high power laser beam for selective excitation of a desired isotope specie in a gaseous mixture of isotope species comprising generating an infrared laser beam at a first wavelength; shifting the first wavelength of said laser beam to a second wavelength; amplifying said second wavelength laser beam to said high power; irradiating said gaseous mixture with said high power laser beam to selectively excite said desired isotope specie; and shifting said second wavelength laser beam to a wavelength coincident with a vibrational state of said desired isotope specie separate from vibrational states of said other isotope species in said gas mixture.]

*10. An infrared laser irradiation system for generating a high power laser beam at a desired wavelength and desired linewidth comprising:*

*molecular gas laser oscillator means for producing a laser beam at a first wavelength;*

*Raman spin flip means in optical alignment with said laser beam for frequency shifting said laser beam to a second wavelength;*

*molecular gas laser amplifier means in optical alignment with said Raman spin flip means for amplifying said laser beam at said second wavelength to a higher power to produce an amplified second wavelength laser beam;*

*Raman scattering laser means for frequency shifting said amplified second wavelength laser beam to produce said high power laser beam at said desired wavelength and linewidth.*

*11. A method for producing a high power laser beam at a preselected wavelength comprising the steps of:*

*generating an infrared laser beam at a first wavelength;*

*Raman shifting said first wavelength of said laser beam to a second wavelength;*

*amplifying said second wavelength laser beam to said high power;*

*Raman shifting said second wavelength laser beam to said preselected wavelength.*

*12. A laser system for generating a laser signal at approximately 16 μm comprising:*

*$CO_2$ laser means for producing a laser injection beam at a predetermined frequency;*

*$H_2$ Raman scattering means for shifting said predetermined frequency of said laser injection beam to approximately 16 μm using rotational Raman transitions in $H_2$.*

*13. The laser system of claim 12 wherein said predetermined frequency is approximately 10.19 μm.*

*14. A laser system for generating a laser signal at approximately 7.75 μm comprising:*

*CO laser means for producing a laser injection beam at a predetermined frequency;*

*$H_2$ scattering means for shifting said predetermined frequency of said laser injection beam to approximately 7.75 μm using rotational Raman transitions in $H_2$.*

*15. The laser system of claim 14 wherein said predetermined frequency is approximately 5.32 μm.*

* * * * *